Patented Oct. 10, 1933

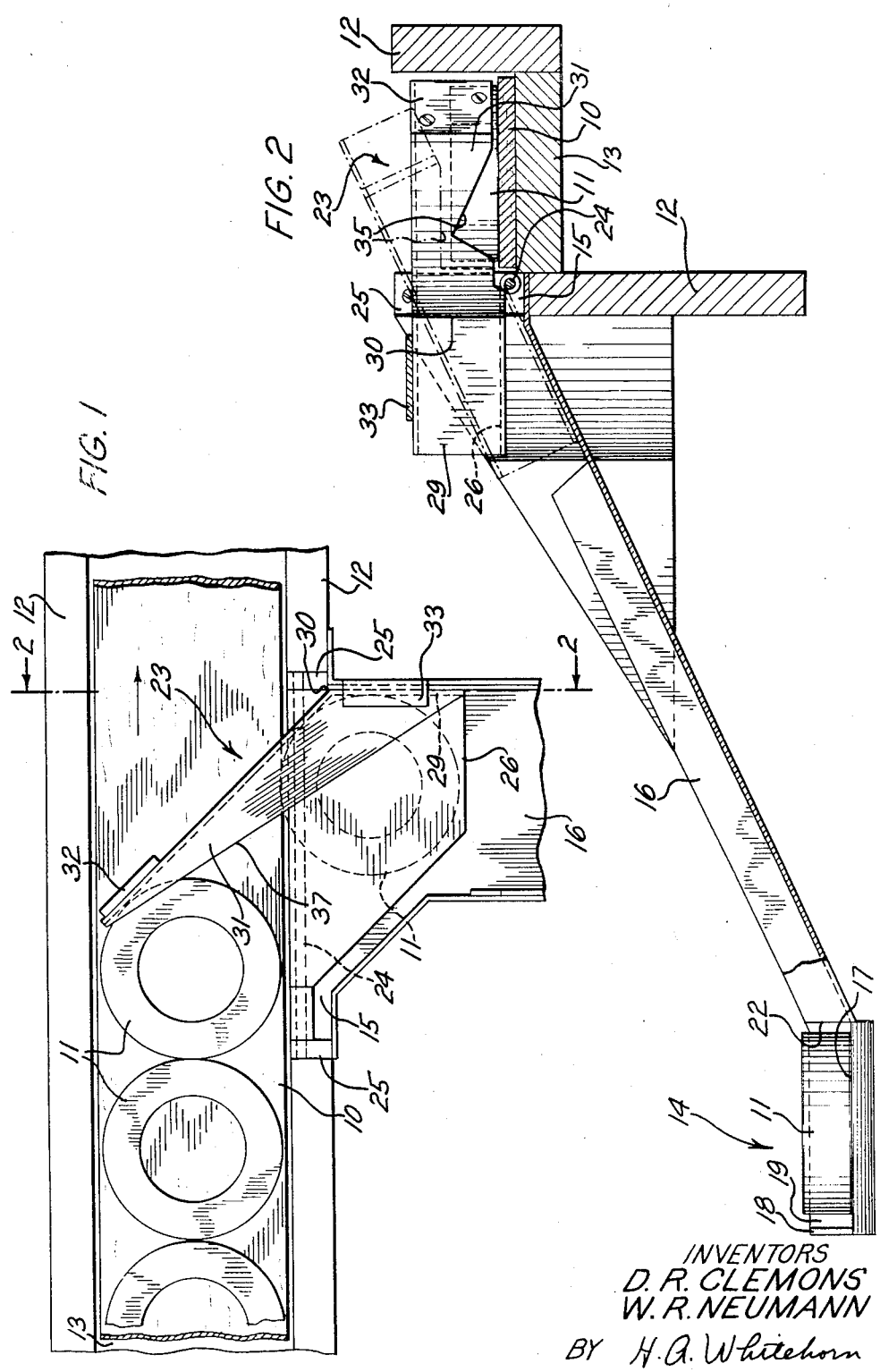

1,929,913

UNITED STATES PATENT OFFICE 1,929,913

CONVEYER SYSTEM

Dale R. Clemons, Riverside, and Warren R. Neumann, Hinsdale, Ill., assignors to Western Electric Company, Incorporated, New York, N. Y., a corporation of New York Application May 13, 1932. Serial No. 611,008

11 Claims. (Cl. 198—21)

This invention relates to conveyer systems, and more particularly to article deflectors for conveyer systems.

An object of this invention is to provide an automatic article deflector for conveyer systems which is simple in construction and efficient in operation.

In accordance with one embodiment of the invention, as applied to an article conveying system having a plurality of stations arranged at intervals along an article conveying element, gravity chutes are provided extending from the conveying element to the stations. At the entrance end of each of the chutes a pivotal article deflector is arranged having a portion normally positioned by gravity across the path of the articles being conveyed and another portion normally positioned over the mouth of the chute for receiving a deflected article. An article deflected from the conveying element moves onto the latter portion of the deflector and the weight of the article thereon swings it downwardly, causing the deflecting portion to move upwardly out of the path of the articles being conveyed to thereby permit the movement of succeeding articles to the next station or stations.

Other objects and advantages of this invention will more fully appear from the following detailed description taken in connection with the accompanying drawing, in which Fig. 1 is a fragmentary plan view of a conveyer system embodying the features of the invention, and Fig. 2 is a vertical sectional view taken on the line 2—2 of Fig. 1 and showing the lower end of the gravity chute.

Referring now to the drawing, wherein a conveyer system is shown fragmentarily, having one embodiment of the article deflector of this invention included therein, 10 indicates a traveling conveyer element which supports and conveys articles 11. The conveyer element 10 may be of any suitable type, but as shown is of the endless belt type (shown fragmentarily) and may be driven by any suitable source of power. The belt 10 travels between upright frame members 12 interconnected by a floor member 13 upon which the belt 10 slides. A plurality of stations, only one of which is indicated in general by the numeral 14 (Fig. 2), are arranged at spaced intervals along the article conveying belt 10, each of the stations being connected to an opening 15, formed in one of the upright frame members 12 by a gravity chute 16 provided with vertical side walls, the chute being rigidly attached in a suitable manner to the adjacent frame member 12. The upper end of the floor of the chute 16 is attached to a horizontal surface of the frame member 12 across the opening 15. At its lower end the chute 16 terminates in a horizontal portion 17 (Fig. 2) having a vertical end wall 18 which serves as a stop for the articles 11 moved by gravity down the chute, the wall 18 being equipped with a rubber block 19 for absorbing the shock of the articles at the end of their movement down the chute. The right side of the verticle side wall of the chute 16 is formed with an opening 22 for the removal of the articles.

At the upper or entrance end of the gravity chute 16 is arranged a pivotal gravity actuated article deflector 23 for automatically deflecting the articles 11 from the traveling belt 10 onto the gravity chute. The article deflector 23 is horizontally pivoted upon a pin 24 journaled at opposite ends in bearing plates 25 fixed to opposite sides of the opening 15 in the frame member 12. A flat normally horizontally positioned floor portion 26 of the deflector 23 extends for a suitable distance, from the pivotal axis adjacent the side of the conveyer belt 10, into the upper or entrance end of the chute 16 and substantially in the plane of the upper surface of the belt (Fig. 2). The floor portion 26 at its right side (Fig. 1) is provided with a vertical wall 29 arranged parallel to the adjacent side wall of the chute 16 and is of a suitable height to extend above the top of the article which is to be deflected. At a point 30 the wall 29 is bent at a suitable angle to extend diagonally across the belt 10 and into the path of the articles 11 being conveyed to provide a deflecting arm 31, a suitable clearance being provided between the lower edge surface of the arm 31 and the upper surface of the belt.

The free end of the deflecting arm 31 has attached thereto a weight 32 which serves to normally maintain the arm in a deflecting position over the belt 10 and consequently the integral floor portion 26 will also be maintained in a horizontal position as shown in full lines in Fig. 2. In the normal position of the deflecting arm 31 the upper end of the vertical wall 29 engages a stop arm 33 formed integral with the right side wall of the chute 16. This serves to hold the floor portion 26 in the plane of the upper surface of the belt 10 and prevents the lower edge of the deflecting arm 31 from engaging the belt 10. The deflecting arm 31 is provided at a predetermined point along its lower edge with a triangular shaped notch 35, the purpose of which will hereinafter be described. For the purpose of stiffening the deflecting arm 31 a horizontal flange 37 integral with the wall 29 extends from the free end of the floor portion 26 to the free end of the deflecting arm 31. It will be observed that the area and shape of the chute 16 at its entrance end and the floor portion 26 of the deflector 23 are such that the articles 11 are freely deflected from the traveling belt 10 by their engagement with the vertical wall of the diagonally disposed deflecting arm 31 without coming into engagement with the left side wall of the chute 16 and are entirely supported on the belt or the floor portion during their deflection into the entrance end of the chute.

The operation of the above described automatic article deflector of this invention is as follows, it being assumed that a series of abutting articles 11 are being conveyed by the traveling belt 10 in the direction of the arrow (Fig. 1). As shown in Fig. 1, the extreme right hand article 11 on the belt 10 has engaged the deflecting arm 31 and in the continued advance of the belt the article will be deflected from the belt onto the floor portion 26 disposed in the plane of the belt. When the article has reached such a position, indicated in dotted outline (Fig. 1), on the floor portion 26, that the center of gravity of the deflector 23 is at the left side of the pivotal point thereof, as viewed in Fig. 2, due to the weight of the article on the floor portion 26, the deflector will turn upon its pivot causing the floor portion to move downwardly and the deflecting arm 31 to move upwardly. This latter position of the deflector is shown in dotted outline in Fig. 2. The deflected article 11 thus moves by gravity from the floor portion 26 and down the chute 26 onto the horizontal portion 17 and into engagement with the rubber stop block 19.

In its upper position the deflecting arm 31, due to the notch 35 in its lower edge, is completely out of the path of the following articles 11 on the belt 10 and in the interval of time during which the deflector is rocked about its pivot to discharge the deflected article 11 from the floor portion 26 thereof onto the chute 16 and the return of the deflector to its deflecting position by gravity, shown in full lines (Fig. 2), the next succeeding article or articles 11 on the belt are permitted to be carried toward the deflectors 23 at the next stations (not shown). Also, when the delivery chute 16 is filled with articles 11, the uppermost article thereon will hold the floor portion 26 of the deflector 23 in its down position and the deflecting arm 31 thereof in its up position out of the path of the articles being conveyed. Thus, the movement of the articles by the belt 10 to succeeding stations is uninterrupted. When the lowermost article 11 on the chute 16 is removed, the rest of the articles will move one space downwardly, which permits the deflector 23 to move by gravity to its deflecting position over the belt 10, and thereafter the next article engaging the deflector will be deflected into the chute 16. In this manner a predetermined supply of articles 11 may be constantly maintained or stored in the chute 16 at each station 14 in the system, the number of articles depending on the length of the chute. Furthermore, any number of stations may be supplied with articles simultaneously by a single conveyer element.

Although a specific embodiment of this invention has herein been disclosed and described, it is to be understood that other modifications and adaptations thereof may be made without departing from the scope of the appended claims.

What is claimed is:

1. In an article conveying system, an article deflector normally positioned in the path of an article being conveyed for deflecting the article and having a portion for receiving the deflected article, said deflector being mounted for movement out of said path by the weight of the deflected article while positioned upon said portion.

2. In a conveyer, a deflector normally held by gravity in the path of articles being conveyed, and means operatively connected to said deflector for moving the deflector out of said path, said means being operated by the weight of an article after said article has been deflected from said path.

3. In an article conveying system, an element for conveying articles in abutting relationship, an article deflector normally positioned in the path of the articles being conveyed for deflecting an article from said element and having a portion for receiving the deflected article, said deflector rendered ineffective for deflecting a following abutting article by the weight of the deflected article while positioned upon said portion.

4. In a conveyer system, a conveyer for articles, article deflecting means normally positioned by gravity in the path of the articles being conveyed for deflecting an article from said conveyer and having a portion for receiving the deflected article, and means for mounting said deflecting means for movement out of said path by the weight of the deflected article while positioned upon said receiving portion.

5. In a conveyer system, a conveyer for articles, and a movable member having a portion normally positioned by gravity for deflecting an article from said conveyer and another portion for receiving a deflected article, said deflecting portion being moved out of its deflecting position by the weight of a deflected article while positioned upon said receiving portion.

6. In a conveyer system, a conveyer for articles, and a pivotal member having a portion normally positioned by gravity for deflecting an article from said conveyer and another portion positioned substantially in the plane of the conveyer for receiving the deflected article, said receiving portion being gravity actuated to discharge the deflected article therefrom.

7. In a conveyer system, a conveyer for articles, and a member normally maintained by gravity in operative position for deflecting an article from said conveyer, said member including a portion arranged to receive thereon the deflected article, the weight of the article thereon momentarily rendering the member ineffective for deflecting succeeding articles and simultaneously discharging the deflected article.

8. In a conveyer system, a horizontal article conveyer, a gravity chute diverging therefrom, and a pivotal member having a portion normally positioned by gravity in the path of articles on said conveyer for deflecting an article therefrom and another portion extending over the chute for receiving the deflected article, said receiving portion being responsive to the weight of the deflected article for discharging said article onto the chute and simultaneously moving the deflecting portion out of the path of succeeding articles on the conveyer.

9. In a conveyer system, a conveyer for articles, a gravity chute at one side of said conveyer, and an article deflecting member pivoted horizontally at the upper end of the chute and normally maintained by gravity in deflecting position in the path of the articles on said conveyer, said member including a portion normally positioned substantially in the plane of the conveyer and extending over the chute for receiving a deflected article thereon, whereupon the weight of the article on said portion rocks said pivoted member to move the deflecting portion thereof out of the path of the following articles on the conveyer and simultaneously discharge the deflected article onto the chute.

10. In an article conveying system, a movable article deflector having a portion normally positioned in the path of articles being conveyed for deflecting an article from said path and having another portion normally positioned substantially in the plane of said path for receiving the deflected article, said receiving portion being movable out of said plane by the weight of the deflected article whereby the deflecting portion is moved out of the path of succeeding articles.

11. In an article conveying system, an article conveyer movable in a horizontal plane, a horizontally pivoted article deflector having a portion normally positioned substantially vertical to the plane of said conveyer, spaced therefrom and in the path of an article being conveyed for deflecting the article from said path and having another portion normally positioned substantially in the plane of said conveyer for receiving the deflected article, said receiving portion being movable out of said plane by the weight of the deflected article whereby the deflecting portion is moved out of said path.

DALE R. CLEMONS.
WARREN R. NEUMANN.